United States Patent
Nakahara (10) Patent No.: US 8,264,930 B2
(45) Date of Patent: Sep. 11, 2012

(54) OPTICAL DISC DISCRIMINATING METHOD AND OPTICAL DISC DISCRIMINATING APPARATUS

(75) Inventor: Hironori Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 12/528,826

(22) PCT Filed: Mar. 13, 2008

(86) PCT No.: PCT/JP2008/054585
§ 371 (c)(1),
(2), (4) Date: Aug. 27, 2009

(87) PCT Pub. No.: WO2008/117671
PCT Pub. Date: Oct. 2, 2008

(65) Prior Publication Data
US 2010/0085854 A1    Apr. 8, 2010

(30) Foreign Application Priority Data
Mar. 23, 2007    (JP) .................................. 2007-075736

(51) Int. Cl.
*G11B 7/00*    (2006.01)
(52) U.S. Cl. ................. 369/53.27; 369/53.1; 369/53.22; 369/53.37; 369/14
(58) Field of Classification Search .................... 347/19, 347/149; 250/559.07; 369/47.15, 53.22, 369/109.01, 112.23, 47.1, 53.1, 53.27, 53.37
See application file for complete search history.

(56) References Cited

U.S. PATENT DOCUMENTS

| | | | |
|---|---|---|---|
| 6,291,829 B1* | 9/2001 | Allen et al. | 250/559.07 |
| 2004/0257942 A1* | 12/2004 | Higashiyama | 369/53.2 |
| 2006/0114774 A1* | 6/2006 | Kun-yi | 369/44.32 |
| 2008/0143776 A1* | 6/2008 | Konno et al. | 347/19 |

FOREIGN PATENT DOCUMENTS

| | | |
|---|---|---|
| JP | 3-198225 A | 8/1991 |
| JP | 4-2317 U | 1/1992 |
| JP | 6-119638 A | 4/1994 |
| JP | 6-318323 A | 11/1994 |
| JP | 7-32742 U | 6/1995 |
| JP | 10-154348 A | 6/1998 |
| JP | 10-312566 A | 11/1998 |
| JP | 2008-4187 A | 1/2008 |

* cited by examiner

*Primary Examiner* — Wayne Young
*Assistant Examiner* — Dionne Pendleton
(74) *Attorney, Agent, or Firm* — Birch, Stewart, Kolasch & Birch, LLP (57) ABSTRACT

An optical disc discriminating method and an optical disc discriminating apparatus which can discriminate a type of optical disc with a simple configuration, causes a drive means to vary an incident angle of a laser light beam with respect to an optical disc while irradiating the optical disc with the laser light beam from a light beam generating section, causes a photodetector to detect a diffraction light of the laser light beam from a recording track of the optical disc, detects a value corresponding to the incident angle when the diffraction light is detected, and discriminates the type of the optical disc on the basis of the detected value.

28 Claims, 11 Drawing Sheets

CD: WHEN $\beta = \beta_1$ AND $\theta_r = \theta_{rc1} = \theta + \beta$.

FIG. 5B

CD: WHEN $\beta = \beta_2$ AND $\theta_r = \theta_{rc2} = \theta + \beta < \theta_{rc1}$.

FIG. 5C

CD: WHEN $\beta = \beta_3 = 0°$ AND $\theta_r = \theta_{rc3} < \theta_{rc2}$.

FIG. 6A

DVD: WHEN $\beta = \beta_1$ AND $\theta_r = \theta_{rd1} = \theta + \beta$.

FIG. 6B

DVD: WHEN $\beta = \beta_2$ AND $\theta_r = \theta_{rd2} = \theta + \beta < \theta_{rd1}$.

FIG. 6C

DVD: WHEN $\beta = \beta_3 = 0°$ AND $\theta_r = \theta_{rd3} < \theta_{rd2}$.

OPTICAL DISC DISCRIMINATING METHOD AND OPTICAL DISC DISCRIMINATING APPARATUS

TECHNICAL FIELD

The present invention relates to an optical disc discriminating method and an optical disc discriminating apparatus utilized for an optical disc apparatus capable of reading and/or writing information from/on a plurality of types of optical discs each having a different track pitch of a spiral recording track formed on an information recording surface of the optical disc.

BACKGROUND ART

There is an optical disc apparatus which can read and/or write information from/on three types of optical discs: CD (compact disc), DVD (digital versatile disc), and BD (Blu-ray disc). A CD has a track pitch of 1.6 μm and a capacity of 650 MB, and an infrared laser light with a wavelength of about 0.78 μm and an objective lens with a numerical aperture (NA) of 0.45 are used for recording or reproducing information on/from a CD. Further, a DVD has a track pitch of 0.74 μm and a capacity of 4.7 GB, and a red laser light with a wavelength of about 0.65 μm and an objective lens with an NA of 0.6 are used for recording or reproducing information on/from a DVD. Furthermore, a BD has a track pitch of 0.32 μm and a capacity of 25 GB, and a blue laser light with a wavelength of about 0.405 μm and an objective lens with an NA of 0.85 are used for recording or reproducing information on/from a BD.

An optical disc apparatus compatible with a plurality of types of optical discs must discriminate a type of inserted optical disc and be set up in accordance with the inserted optical disc. As a conventional optical disc apparatus, there is an apparatus which adopts a method of detecting a diffraction angle of a diffraction light of a laser light beam impinging on the optical disc, by using a two-divided light-receiving element or two separate light-receiving elements, and discriminating a type of the optical disc on the basis of a result of the detection (see patent document 1, for example).

Patent document 1 is Japanese Patent Application Kokai Publication No. 10-154348 (paragraphs 0030 to 0040, FIG. 6 to FIG. 11).

DISCLOSURE OF THE INVENTION

Problems to be Solved by the Invention

However, the conventional optical disc apparatus described above has a problem that a configuration of the optical disc apparatus is complicated because of the necessity of a two-divided light-receiving element or two light-receiving elements for the purpose of discriminating a plurality of types of optical discs.

The present invention has been made to solve the problem of the above-described conventional art and its object is to provide an optical disc discriminating method and an optical disc discriminating apparatus which can discriminate a type of optical disc with a simple configuration.

Means of Solving the Problem

An optical disc discriminating method according to the present invention discriminates a type of optical disc which is loaded into an optical disc apparatus, and includes the steps of: varying, by an incident angle varying means, an incident angle of a laser light beam with respect to an optical disc while irradiating the optical disc with the laser light beam from a light beam generating means; detecting, by an incident angle detecting means, a value corresponding to the incident angle when a diffraction light of the laser light beam from a recording track of the optical disc is detected by a photo-detecting means; and discriminating the type of the optical disc on the basis of the detected value.

Furthermore, the optical disc discriminating apparatus according to the present invention discriminates a type of optical disc which is loaded into an optical disc apparatus, and includes: a light beam generating means generating a laser light beam, with which the optical disc is irradiated; an incident angle varying means varying an incident angle of the laser light beam with respect to the optical disc; a photo-detecting means; an incident angle detecting means detecting a value corresponding to the incident angle; and a control means which causes the incident angle varying means to vary the incident angle of the laser light beam with respect to an optical disc while irradiating the optical disc with the laser light beam from a light beam generating means, and which discriminates the type of the optical disc on the basis of the value corresponding to the incident angle when a diffraction light of the laser light beam from a recording track of the optical disc is detected by the photo-detecting means.

EFFECTS OF THE INVENTION

The optical disc discriminating method or the optical disc discriminating apparatus according to the present invention can realize an effect that a type of optical disc loaded into an optical disc apparatus can be discriminated by a simple configuration that can reduce the number of the single photo-detecting means to one.

EXPLANATION OF REFERENCE NUMERALS AND SYMBOLS

1 disc tray; 2 optical disc; 2a CD; 2b DVD; light beam generating section; 3a semiconductor laser; 3b collimator lens; 5 photodetector; 8 plane or member parallel to traverse chassis; 11 traverse chassis; spindle motor; 13 turntable; 14 optical head; 15 thread feed shaft; 16 support shaft (rotation shaft); 21 recording-track-formed region; 22 central hole; 23 pit of optical disc; 24 recording mark on optical disc; drive means; 18 angle varying means; 19 control means; 30, 40, 50 light beam generator or optical head; case section; 32 objective lens support section; 33 objective lens; 34 opening; 41 case section; 42 objective lens support section; 43 objective lens; 44 slide plate; 45 opening; 51 first case section; 52 second case section; 53 objective lens; 54 opening; drive mechanism; 56 guide mechanism; 61 resistor; comparator; 63 discriminator; $L_1$ laser light beam; $L_2$ diffraction light; $L_{31}$ first-order diffraction light from CD; $L_{32}$ second-order diffraction light from CD; $L_{41}$ first-order diffraction light from DVD; SP light spot; T track; TP track pitch; XD radial direction of optical disc; β incident angle (tilt angle); θ diffraction angle; θr angle between incident beam and diffraction light.

BEST MODE FOR CARRYING OUT THE INVENTION

First Embodiment

Figure 1:
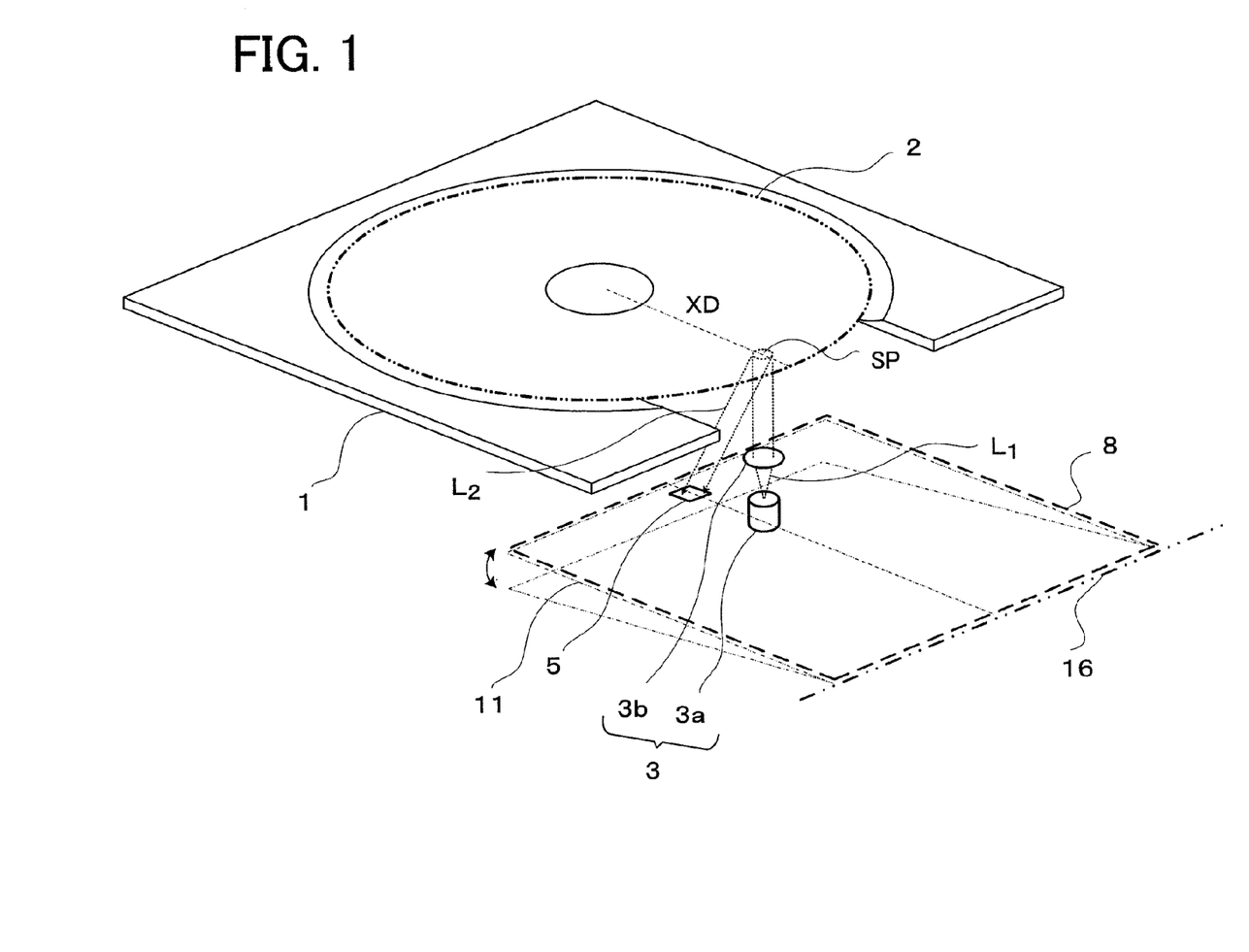
FIG. 1 is a perspective view schematically illustrating a configuration of an optical disc discriminating apparatus according to a first embodiment of the present invention.

FIG. 1 is a perspective view schematically illustrating a configuration of an optical disc discriminating apparatus according to the first embodiment (an apparatus which implements an optical disc discriminating method according to the first embodiment) of the present invention. As shown in FIG. 1, the optical disc discriminating apparatus according to the first embodiment includes a light beam generating section (light beam generating means) 3 which irradiates an optical disc 2 loaded onto a disc tray 1 of an optical disc apparatus with a laser light beam $L_1$, and a photodetector (photo-detecting means) 5 which detects a diffraction light $L_2$ from the optical disc 2 which is irradiated with the laser light beam $L_1$. The light beam generating section 3 includes a semiconductor laser 3a which generates the laser light beam $L_1$ and a collimator lens 3b.

The optical disc 2 to be loaded on the disc tray 1 of the optical disc apparatus is CD, DVD, or BD, for example. The laser light beam $L_1$ emitted from the semiconductor laser 3a is collimated by the collimator lens 3b to become a parallel light, and this parallel light travels toward and impinges on an information recording surface of the optical disc 2 from under the optical disc 2. The laser light beam $L_1$ impinging on the optical disc 2 generates the diffraction light $L_2$. Further, the semiconductor laser 3a and the photodetector 5 are disposed on a plane 8 parallel to a traverse chassis 11. The member to which the semiconductor laser 3a and the photodetector 5 are fixed is not limited to a plane. The member to which the semiconductor laser 3a and the photodetector 5 are fixed is the inside of an optical head 14 shown in FIG. 4A described below, for example. Furthermore, the semiconductor laser 3a and the photodetector 5 are disposed along the radial direction of the optical disc 2, which is shown as a dot-dash line XD in FIG. 1. Furthermore, in the first embodiment, it is sufficient that the photodetector 5 has a single light receiving surface.

Figure 2:
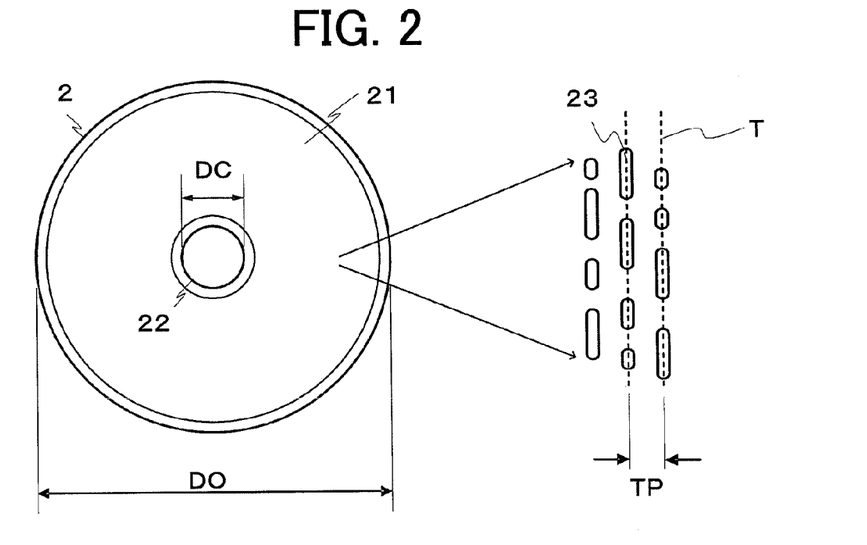
FIG. 2 is a diagram illustrating a plan view and recording tracks of a playback-only optical disc.

FIG. 2 is a diagram illustrating a playback-only optical disc in plan view and recording tracks. The playback-only optical disc 2 shown in FIG. 2 has an outer diameter of DO, a central hole 22 with a diameter of DC, and a spiral recording track 25 which includes aligned pits 23 and is formed with a track pitch of TP in a recording-track-formed region 21.

Figure 3:
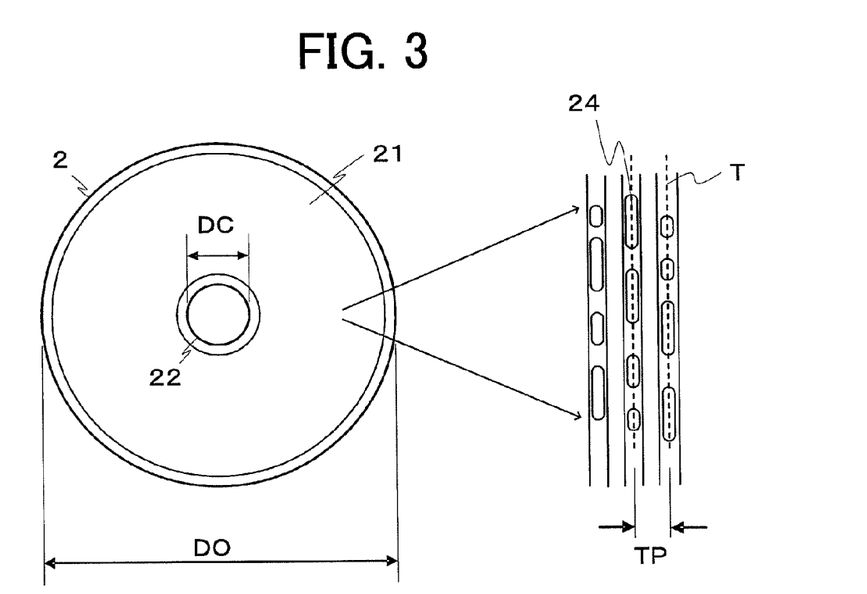
FIG. 3 is a diagram illustrating a plan view and recording tracks of a recordable optical disc.

FIG. 3 is a diagram illustrating a recordable optical disc in plan view and recording tracks. The recordable (write-once type or rewritable type) optical disc shown in FIG. 3 has an outer diameter of DO, a central hole 22 with a diameter of DC, and a spiral recording track 26 in which recording marks 24 are written and which is formed with a track pitch of TP in a recording-track-formed region 21.

A CD, a DVD, a BD or the like having the same outer diameter of DO is available as the optical discs 2 having different track pitches. The track pitch TP between the spiral recording tracks in the recording-track-formed region 21 of a CD is 1.6 μm. The track pitch TP between the spiral recording tracks in the recording-track-formed region 21 of a DVD is 0.74 μm. The track pitch TP between the spiral recording tracks in the recording-track-formed region 21 of a BD is 0.32 μm.

Figure 4A:
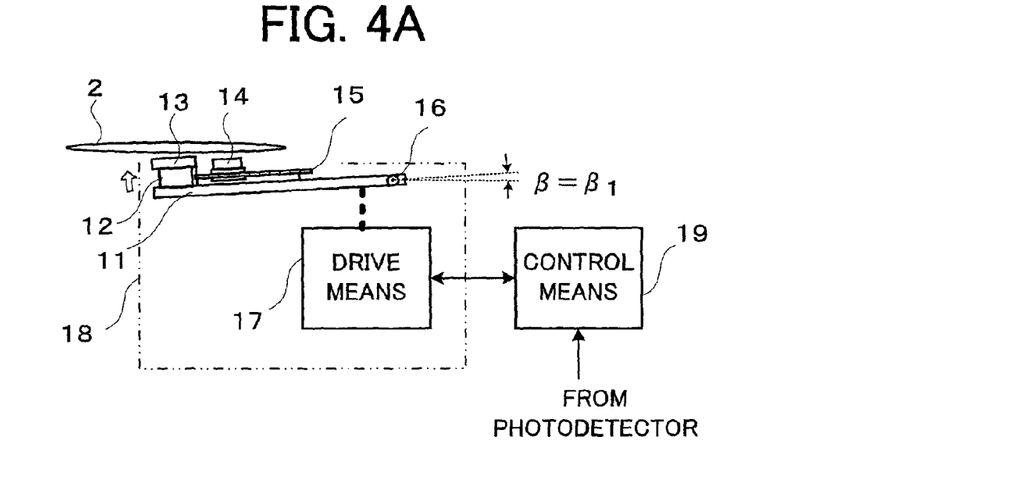
FIG. 4A to FIG. 4C are diagrams illustrating a rotary movement of a traverse chassis which is an incident-angle varying operation in the optical disc discriminating apparatus according to the first embodiment.
Figure 4B:
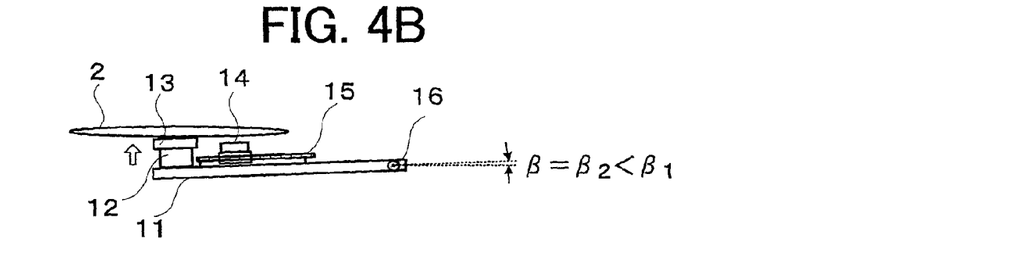
Figure 4C:
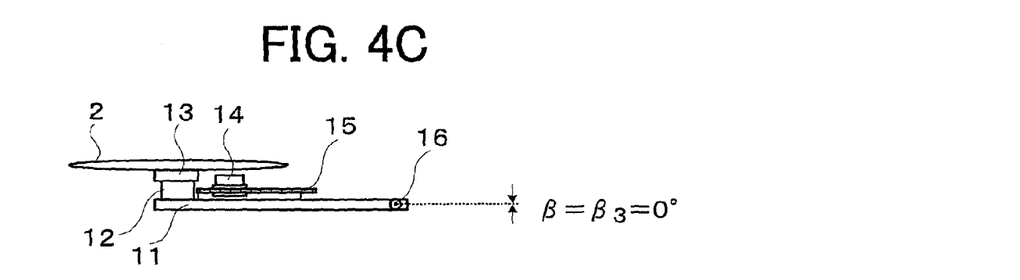

FIG. 4A to FIG. 4C are diagrams illustrating a rotary movement of the traverse chassis 11 which is an incident-angle varying operation in the optical disc discriminating apparatus according to the first embodiment. In FIG. 4A to FIG. 4C, the optical disc 2 is placed on the disc tray 1 and is being inserted inside the optical disc apparatus (that is, is at a loaded state), as shown in FIG. 1.

As shown in FIG. 4A, the optical disc apparatus includes a spindle motor 12 for rotating the optical disc 2 on the traverse chassis 11 and a turntable 13, on which the optical disc 2 is placed, for transmitting a rotation of the spindle motor 12 to the optical disc 2. Further, the optical disc apparatus includes the optical head 14 for recording or reproducing on/from the rotating optical disc 2 and a thread feed shaft 15 for supporting the optical head 14. The optical disc 2 being loaded on the disc tray 1 and inserted inside the optical disc apparatus is placed on the turntable 13 as shown in FIG. 4C, by the operation to rotate the traverse chassis 11 which proceeds in order of FIG. 4A, FIG. 4B, and FIG. 4C.

The light beam generating section 3 and the photodetector 5 shown in FIG. 1 are disposed inside the optical head 14, for example. Further, an optical system disposed inside the optical head 14 for the purpose of reading or writing information from/onto an optical disc may be used as the light beam generating section 3.

As shown in FIG. 4A, before the optical disc 2 is placed on the turntable 13, the turntable 13 rotates so as to move up gradually from a state of FIG. 4A to a state of FIG. 4B further to a state of FIG. 4C in order to place the optical disc 2 on the turntable 13. Such movement of the turntable 13 is caused by the rotation of the traverse chassis 11 around a rotation shaft (support shaft) 16 by a driving power of the drive means 17 and the operation from the state in FIG. 4A to the state in FIG. 4C is referred to as "turntable move-up operation". Further, a rotation angle (a change in tilt angle) of the traverse chassis 11 at that time is denoted as '$\beta$'.

In the optical disc discriminating apparatus according to the first embodiment, the turntable move-up operation is the incident-angle varying operation in which an incident angle (equal to $\beta$) of the laser light beam $L_1$ with respect to the optical disc 2 is varied while the optical disc 2 is being irradiated with a laser light beam $L_1$, and reference numeral 18 in FIG. 4A denotes the incident-angle varying means. In the optical disc discriminating apparatus according to the first embodiment, the incident angle varying means 18 varies the incident angle $\beta$ of the laser light beam $L_1$ with respect to the optical disc 2 (which is also a tilt angle of the traverse chassis 11 or the plane 8 shown in FIG. 1) while the optical disc 2 is being irradiated with the laser light beam $L_1$. At the incident-angle varying operation, a value corresponding to the incident angle $\beta$ is detected when the diffraction light $L_2$ of the laser light beam $L_1$ from a recording track of the optical disc 2 is detected by the photodetector 5. Then, the type of the optical disc 2 is discriminated on the basis of the detected value corresponding to the incident angle $\beta$. The discrimination is performed by a discriminating means which is included in the control means 19 of FIG. 4A. Further, the incident-angle varying means 18 has a function as the incident-angle detecting means which detects a value corresponding to a rotation angle, on the basis of the value corresponding to a rotation angle $\beta$ of the traverse chassis 11, for example, the number of revolutions of a motor or the like.

Figure 5A:
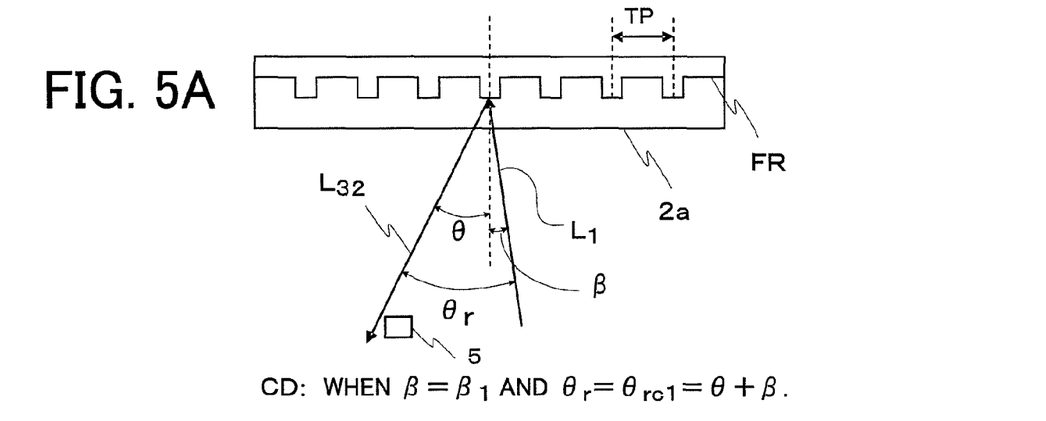
FIG. 5A to FIG. 5C are diagrams illustrating changes in a path of a second-order diffraction light when the optical disc discriminating apparatus according to the first embodiment varies an incident angle while irradiating a CD with a laser light beam.

FIG. 5A to FIG. 5O are diagrams illustrating a change in a path of a second-order diffraction light $L_{32}$ when the optical disc discriminating apparatus according to the first embodiment varies the incident angle $\beta$ while irradiating a CD with the laser light beam $L_1$. Further, FIG. 6A to FIG. 6C are diagrams illustrating a change in a path of a first-order diffraction light $L_{41}$ when the optical disc discriminating apparatus according to the first embodiment varies the incident angle $\beta$ while irradiating a DVD with the laser light beam. Here, the laser light beam $L_1$ is a parallel light having a wavelength of 0.650 μm. The states of FIG. 5A to FIG. 5C correspond to the states of FIG. 4A to FIG. 4C, respectively.

Furthermore, the states of FIG. 6A to FIG. 6C correspond to the states of FIG. 4A to FIG. 4C, respectively. In FIG. 5A to FIG. 5C and FIG. 6A to FIG. 6C, '$\beta$' denotes an incident angle of the incident beam, '$\theta$' denotes a diffraction angle, '$\theta_r$' denotes an angle between the incident beam and the diffraction light, and $\theta_r = \theta + \beta$ holds.

Figure 5B:
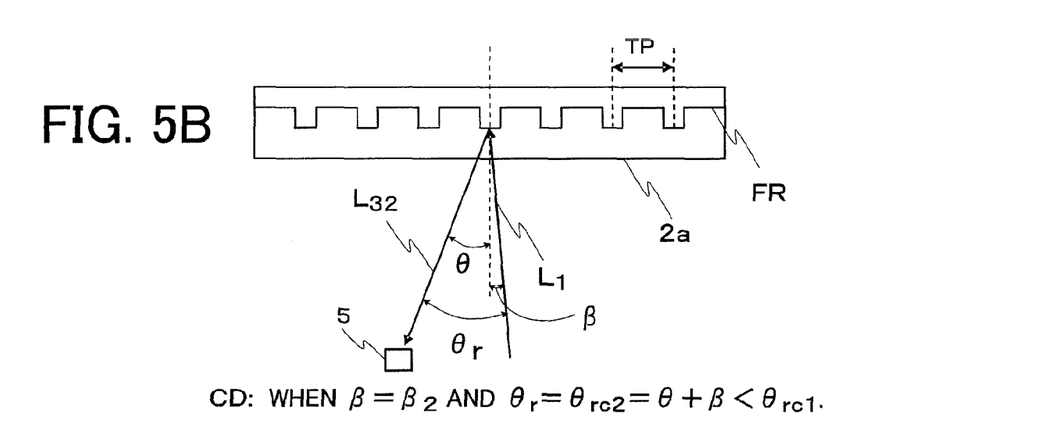
Figure 5C:
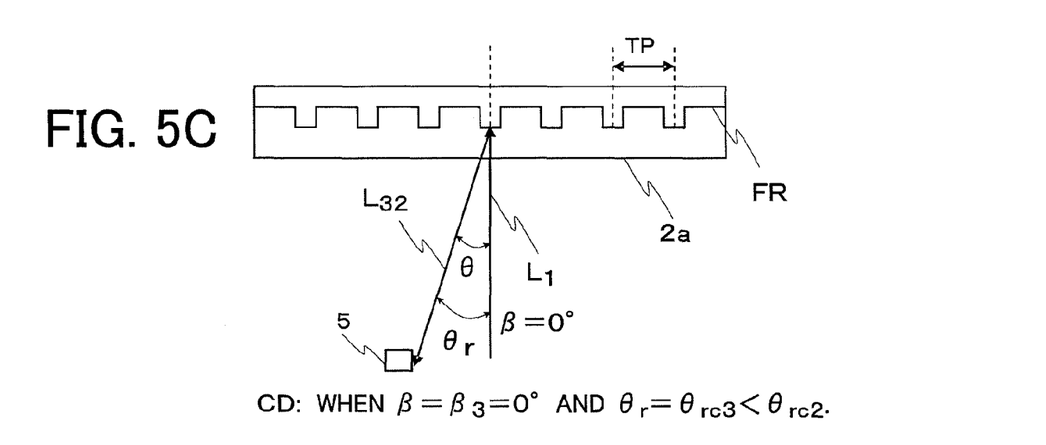
Figure 6A:
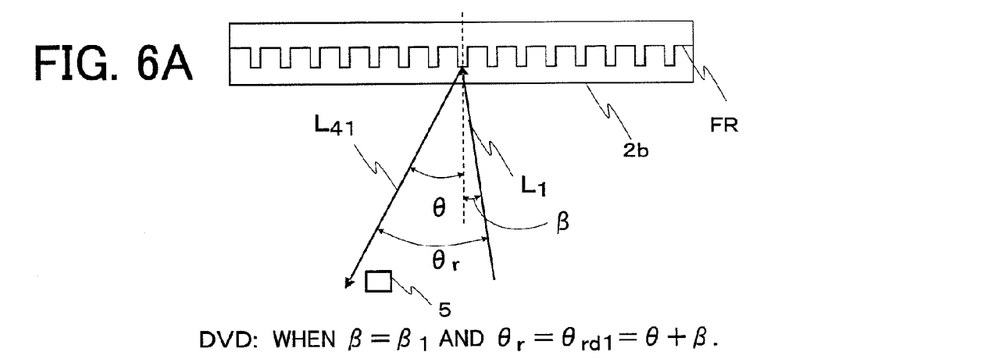
FIG. 6A to FIG. 6C are diagrams illustrating changes in a path of a first-order diffraction light when the optical disc discriminating apparatus according to the first embodiment varies an incident angle while irradiating a DVD with a laser light beam.
Figure 6B:
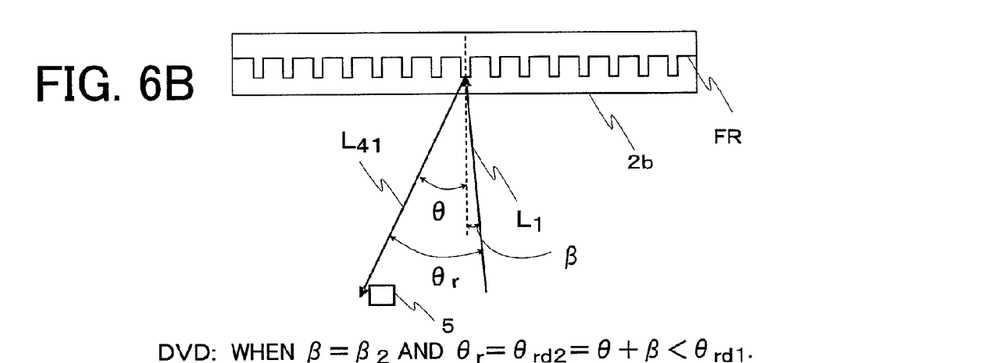
Figure 6C:
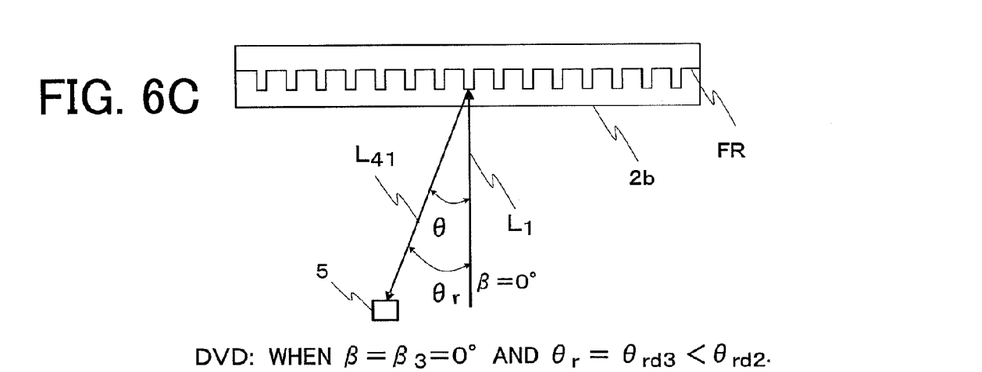

In the first embodiment, after a CD as the optical disc 2 is placed on the disc tray 2 and inserted inside the disc apparatus, the traverse chassis 11 is moved upward, the state changes from that shown in FIG. 5A ($\beta=\beta_1$, $\theta_r=\theta_{rc1}$) through that shown in FIG. 5B ($\beta=\beta_2<\beta_1$, $\theta_r=\theta_{rc1}<\theta_{rc2}$) and to that shown in FIG. 5C ($\beta=\beta_3=0$, $\theta_r=\theta_{rc3}<\theta_{rc2}$). In the state shown in FIG. 5A ($\beta=\beta_1$, $\theta_r=\theta_{rc1}$) the second-order diffraction light $L_{32}$ does not enter the photodetector 5; in the state shown in FIG. 5B ($\beta=\beta_2<\beta_1$, $\theta_r=\theta_{rc2}<\theta_{rc1}$) the second-order diffraction light $L_{32}$ enters the photodetector 5; and in the state shown in FIG. 5C ($\beta=\beta_3=0$, $\theta_r=\theta_{rc3}<\theta_{rc2}$) the second-order diffraction light $L_{32}$ no longer enters the photodetector 5.

Furthermore, in the first embodiment, after a DVD as the optical disc 2 is placed on the disc tray 2 and inserted inside on the disc apparatus, the traverse chassis 11 is moved upward, the state changes from that shown in FIG. 6A ($\beta=\beta_1$, $\theta_r=\theta_{rd1}$), through that shown in FIG. 6B ($\beta=\beta_2<\beta_1$, $\theta_r=\theta_{rd2}<\theta_{rd1}$) and to that shown in FIG. 6C ($\beta=\beta_3=0$, $\theta_r=\theta_{rd3}<\theta_{rd2}$). In the state shown in FIG. 6A ($\beta=\beta_1$, $\theta_r=\theta_{rd1}$), the first-order diffraction light $L_{41}$ does not enter the photodetector 5; in the state shown in FIG. 6B ($\beta=\beta_2<\beta_1$, $\theta_r=\theta_{rd2}<\theta_{rd1}$), the first-order diffraction light $L_{41}$ does not enter the photodetector 5; and in the state in FIG. 6C ($\beta=\beta_3=0$, $\theta_r=\theta_{rd3}<\theta_{rd2}$), the first-order diffraction light $L_{41}$ enters the photodetector 5.

Figure 7:
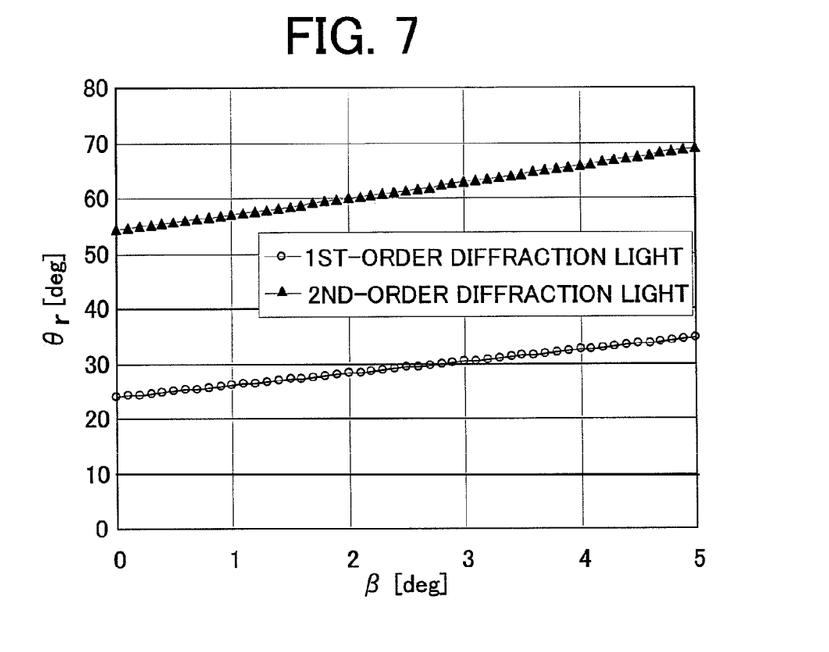
FIG. 7 is a diagram showing a result of calculating directions of the first-order diffraction light and the second-order diffraction light when the optical disc discriminating apparatus according to the first embodiment varies an incident angle while irradiating a CD with a laser light beam.
Figure 8:
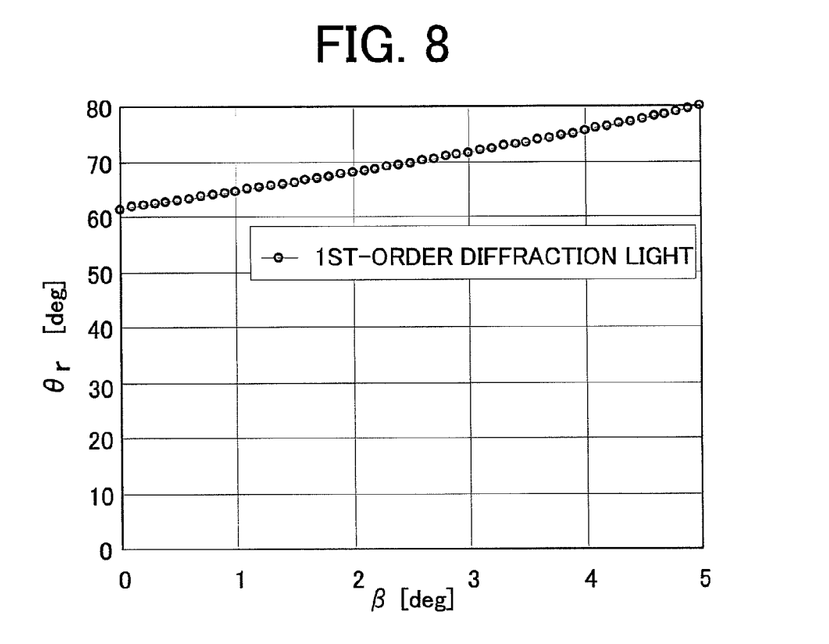
FIG. 8 is a diagram showing a result of calculating a direction of the first-order diffraction light when the optical disc discriminating apparatus according to the first embodiment varies an incident angle while irradiating a DVD with a laser light beam.

FIG. 7 is a diagram showing a result of calculating directions of the first-order diffraction light $L_{31}$ and the second-order diffraction light $L_{32}$ when the optical disc discriminating apparatus according to the first embodiment varies the incident angle $\beta$ while irradiating a CD with the laser light beam. Further, FIG. 8 is a diagram showing a result of calculating a direction of the first-order diffraction light $L_{41}$ when the optical disc discriminating apparatus according to the first embodiment varies the incident angle $\beta$ while irradiating a DVD with the laser light beam.

In the first embodiment, the optical disc discriminating apparatus operates during the turntable move-up operation. At the start of the turntable move-up operation, since the tilt angle $\beta$ of the traverse chassis 11 is $\beta_1$ as shown in FIG. 4A, the incident angle $\beta$ of the laser light beam $L_1$ from the light beam generating section 3 with respect to the optical disc 2 placed on the disc tray 1 becomes $\beta_1$ as shown in FIG. 5A. The laser light beam $L_1$ impinging on the recording-track-formed region 21 of the optical disc 2 is diffracted by an arrangement of the recording tracks 25 formed with the track pitch TP, at an incident position in the recording-track-formed region 21, and is reflected by a reflecting layer FR. A reflected diffraction light $L_2$ (which is the second-order diffraction light $L_{32}$ if the optical disc is a CD and is the first-order diffraction light $L_{41}$ if the optical disc is a DVD.) travels in the reverse direction to the laser light beam $L_1$ from the light beam generating section 3, and the diffraction light $L_2$ travels in a direction to form the diffraction angle $\theta$ on a surface including a straight line in the radial direction XD of the optical disc 2 and being perpendicular to the optical disc surface. A relationship among the track pitch TP, the diffraction angle $\theta$ and the rotation angle $\beta$ (incident angle $\beta$) is given by the following expression 1, where '$\lambda$' is a wavelength of the laser light beam and 'n' is diffraction order.

$$TP \cdot (\sin\theta - \sin\beta) = n \cdot \lambda \quad \text{expression 1}$$

In the first embodiment, the laser light beam $L_1$ of $\lambda=0.650$ μm is used. θ in expression 1 will be calculated where $\lambda=0.650$ μm. As the photodetector 5 is disposed on the plane 8 which is parallel to the traverse chassis 11, $\theta_r$ is defined with reference to the laser light beam $L_1$ which is perpendicular to the plane. If the optical disc 2 is a CD, a relationship between $\theta_r$ and the rotation angle β is as shown in FIG. 7. Regarding the diffraction light, the first-order diffraction light $L_{31}$ and the second-order diffraction light $L_{32}$ are generated and the third or more order diffraction light is not generated. If the optical disc 2 is a DVD, a relationship between $\theta_r$, and the rotation angle β is as shown in FIG. 8. Regarding the diffraction light, only the first-order diffraction light $L_{41}$ is generated. If the optical disc 2 is a BD, there is no solution of $\theta_r$ in relation to the rotation angle β, that is, if the disc is a BD, no diffraction light is generated.

At β=0°, the laser light beam $L_1$ from the light beam generating section 3 travels toward and impinges on the recording-track-formed region 21 in the optical disc 2 shown in FIG. 2 or FIG. 3, perpendicularly from under the optical disc 2, and forms a spot SP at the incident position in the recording-track-formed region 21.

When β=0° holds, the first-order diffraction light $L_{41}$ of the DVD enters the single photodetector 5, which is fixed to the plane 8 parallel to the traverse chassis 11 (for example, inside the optical head 14 shown in FIG. 4A) and detects the second-order diffraction light $L_{32}$ of the CD and the first-order diffraction light $L_{41}$ of the DVD, and the photodetector 5 is disposed on the side of the inner circumference of the optical disc as compared with the spot SP. That is, it is determined to place it on a line in the direction of $\theta_r \approx 61°$ from the result of calculation of FIG. 8.

Such setting effects the following states: when the laser light beam $L_1$ from the light beam generating section 3 impinges on a CD, the second-order diffraction light $L_{32}$ of the CD reaches the photodetector 5 at β≈2.5° (at FIG. 5B). Further, when the laser light beam $L_1$ from the light beam generating section 3 impinges on a DVD, the first-order diffraction light $L_{41}$ of the DVD enters the photodetector 5 at β≈0° (at FIG. 6C). Furthermore, when the laser light beam $L_1$ from the light beam generating section 3 impinges on a BD, no diffraction light is generated and thus no light reaches the photodetector 5.

Figure 9:
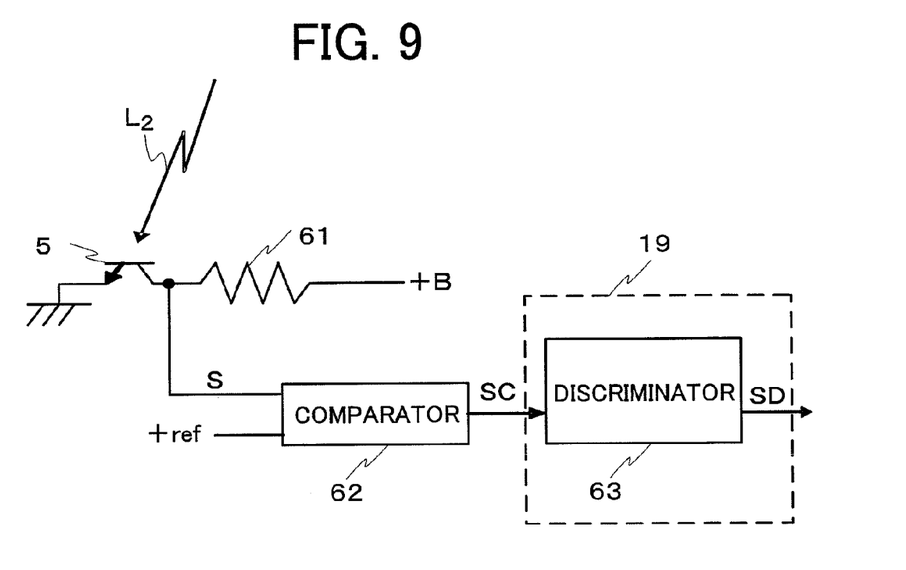
FIG. 9 is a diagram showing a circuit for detecting a diffraction light by the optical disc discriminating apparatus according to the first embodiment.

In the optical disc discriminating apparatus described above, both the second-order diffraction light $L_{32}$ in the case that the laser light beam $L_1$ from the light beam generating section 3 impinges on a CD and the first-order diffraction light $L_{41}$ in the case that the laser light beam from the light beam generating section 3 impinges on a DVD can be detected by the single photodetector 5. The photodetector 5 for the detection is configured, as shown in FIG. 9, by a phototransistor 50 to which an operation voltage is supplied from a power source +B through a resistor 61, for example. The phototransistor 50 causes a comparator 62 in FIG. 9 to be supplied with a detection output signal S which is obtained by detecting the second-order diffraction light $L_{32}$ in the case that the laser light beam $L_1$ from the light beam generating section 3 impinges on the CD and the first-order diffraction light $L_{41}$ in the case that the laser light beam $L_1$ from the light beam generating section 3 impinges on the DVD.

The comparator 62 compares the detection output signal S with a reference voltage +ref and thereby outputs a signal SC indicating whether or not there is the diffraction light $L_{32}$ or $L_{41}$. The detection signal S has a lower electric potential than +B when the second-order diffraction light $L_{32}$ in the case that the laser light beam $L_1$ from the light beam generating section 3 impinges on the CD and the first-order diffraction light $L_{41}$ in the case that the laser light beam $L_1$ from the semiconductor laser impinges on the DVD enter the phototransistor 50. The greater the amount of the diffraction light $L_2$ enters, the closer the electric potential of the detection signal S reaches the ground. Comparing the electric potential of the detection signal S with a reference voltage +ref, the comparator 62 outputs 'HI' as an output SC of the comparator 62, if the reference voltage +ref is lower than the electric potential of the detection signal S. Comparing the electric potential of the detection signal S with the reference voltage +ref, if the electric potential of the detection signal S is higher than the reference voltage +ref, the comparator 62 outputs 'LOW' as an output SC of the comparator 62. Then, a discriminator 63 monitors the output SC of the comparator 62 from the start to the end of the turntable move-up operation to discriminate the optical discs.

Figure 10:
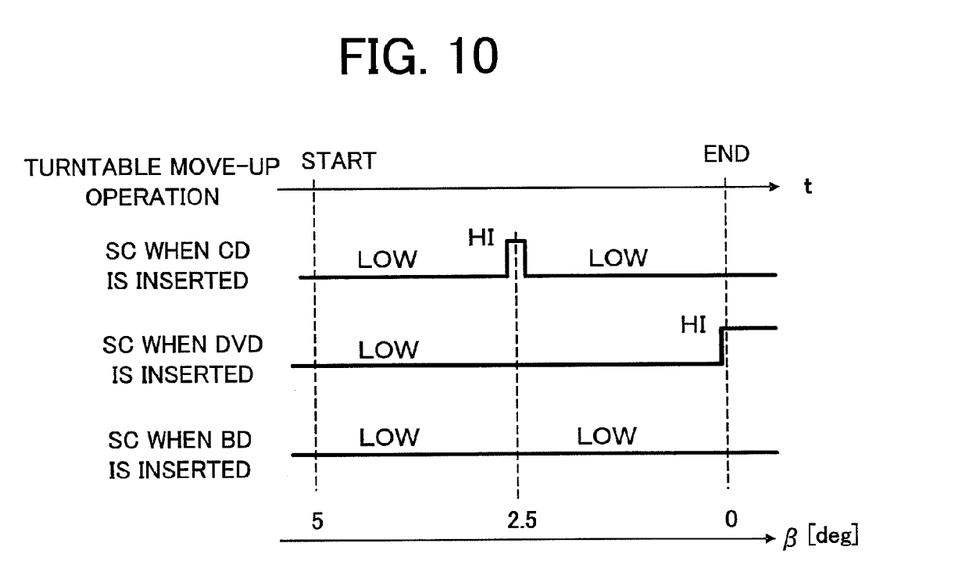
FIG. 10 is a diagram showing comparator outputs when discriminating operation for CD, DVD, and BD is performed by the optical disc discriminating apparatus according to the first embodiment.

FIG. 10 is a diagram showing the comparator output SC when the optical disc discriminating apparatus according to the first embodiment performs the discriminating operation for a CD, a DVD and a BD. FIG. 10 illustrates the output SC of the comparator 62 from the start to the end of the turntable move-up operation in the cases that the optical disc 2 placed on the disc tray 1 is a CD, a DVD and a BD. In the case that the laser light beam $L_1$ from the light beam generating section 3 impinges on a CD, the second-order diffraction light $L_{32}$ once makes the output SC of the comparator 62 to be 'HI' (high level) at β≈2.5° and then, at β<2.5°, the output SC of the comparator 62 returns to 'LOW' (low level). In the case that the laser light beam $L_1$ from the light beam generating section 3 impinges on a DVD, the first-order diffraction light $L_{41}$ once makes the output SC of the comparator 62 to be 'HI' at β≈0° and keeps it 'HI'. In the case that the laser light beam $L_1$ from the light beam generating section 3 impinges on a BD, no diffraction light is generated and thereby the output SC of the comparator 62 keeps to be 'LOW' from the start to the end of the turntable move-up operation. The discriminator 63 monitors the comparison result signal SC, and if a state transition is caused in order of 'LOW', 'HI', 'LOW' from the start to the end of the turntable move-up operation, it determines that the disc is a CD and outputs a discriminator output signal SD. The signal SD using two signal lines and being a 2-bit signal is output as 'LOW', 'LOW', in the case of a CD, for example. Further, the discriminator 63 monitors the output SC of the comparator 62, and if a state transition is caused in order of 'LOW', 'HI' from the start to the end of the turntable move-up operation, it determines that the disc is a DVD and outputs the discriminator output signal SD. The signal SD using two signal lines and being a 2-bit signal is output as 'LOW', 'HI', in the case of a DVD, for example. Furthermore, the discriminator 63 monitors the output SC, and if the 'LOW' state continues from the start to the end of the turntable move-up operation, it determines that the disc is a BD and outputs the discriminator output signal SD. The signal SD using two signal lines and being a 2-bit signal is expressed as 'HI', 'HI', in the case of a BD, for example.

As described above, according to the optical disc discriminating method or the optical disc discriminating apparatus according to the first embodiment, when the optical disc 2 is placed on the disc tray 1 and the optical disc 2 is loaded, the optical disc 2 can be automatically discriminated to be a CD or a DVD or a BD, a result of the discrimination can be output as the discriminator output SD, and can shift to the operation corresponding to the type of the discriminated optical disc. Further, the optical disc discrimination can be finished at the end of the turntable move-up operation for placing the optical disc on the turntable and therefore it is unnecessary to extend waiting time until the start of the playback operation or recording operation from/on the optical disc.

Furthermore, according to the optical disc discriminating method or the optical disc discriminating apparatus according to the first embodiment, it is sufficient to have a single photodetector and thereby the configuration can be simplified.

Second Embodiment

Figure 11:
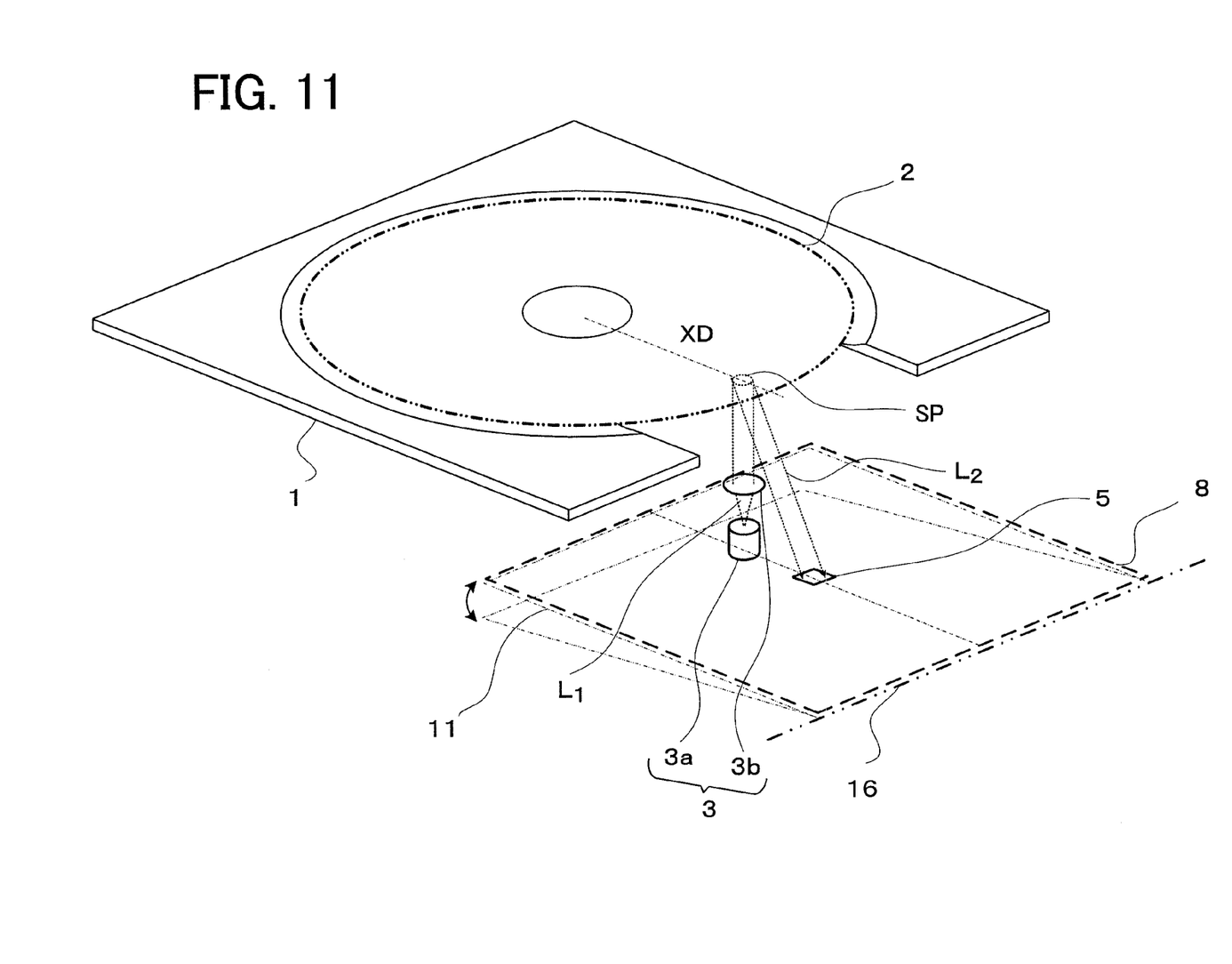
FIG. 11 is a perspective view schematically illustrating a configuration of an optical disc discriminating apparatus according to a second embodiment of the present invention.

FIG. 11 is a perspective view schematically illustrating a configuration of an optical disc discriminating apparatus according to the second embodiment of the present invention. In FIG. 11, components that are the same as or correspond to the components in FIG. 1 are assigned the same reference numerals or symbols. The optical disc discriminating apparatus according to the second embodiment differs from the optical disc discriminating apparatus according to the first embodiment, in a point that a photodetector 5 is disposed outside the light beam generating section 3 in the radial direction XD so that a light beam generating section 3 and the photodetector 5 are arranged on a direction parallel to the radial direction XD.

Figure 12:
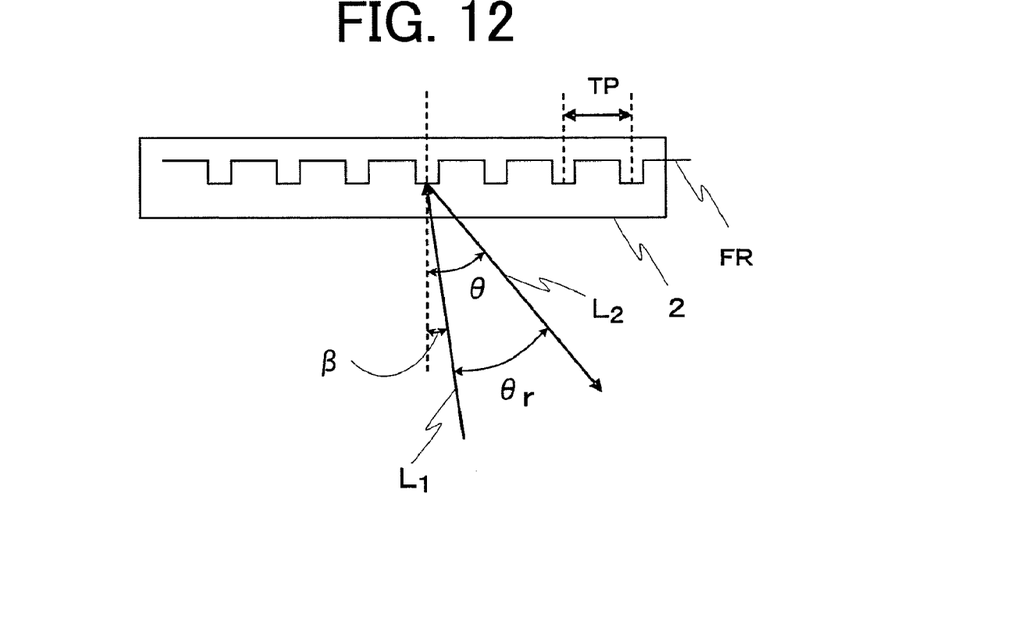
FIG. 12 is a diagram illustrating a laser light beam with which an optical disc is irradiated by the optical disc discriminating apparatus according to the second embodiment and a diffraction light.

FIG. 12 is a diagram illustrating a laser light beam $L_1$, with which the optical disc discriminating apparatus according to the second embodiment irradiates an optical disc, and a diffraction light $L_2$. The optical disc discriminating apparatus according to the second embodiment operates at the turntable move-up operation that is similar to that in the first embodiment. In the turntable move-up operation, as a tilt angle of a traverse chassis 11 is β, an incident angle of the laser light beam $L_1$ with respect to an optical disc 2 placed on a disc tray 1 is β which is the same as the tilt angle, as shown in FIG. 12. The laser light beam $L_1$ impinging on the recording-track-formed region 21 in the optical disc 2 is diffracted by the rows of recording tracks 25 formed with a track pitch TP at an incident position in the recording-track-formed region 21 and is reflected by a reflecting layer FR. The reflected diffraction light $L_2$ returns in a reverse direction to the laser light beam $L_1$ from the light beam generating section 3, and the diffraction light $L_2$ travels in a direction to form a diffraction angle θ in a plane being perpendicular to an optical disc surface and including a line of the radial direction XD of the optical disc 2. In the second embodiment, the diffraction angle θ is given by the following expression 2 as a function of the rotation angle β. Further, 'λ' denotes a wavelength of the laser light beam, and 'n' denotes diffraction order.

$$TP \cdot (\sin \theta + \sin \beta) = n \cdot \lambda \qquad \text{expression 2}$$

Figure 13:
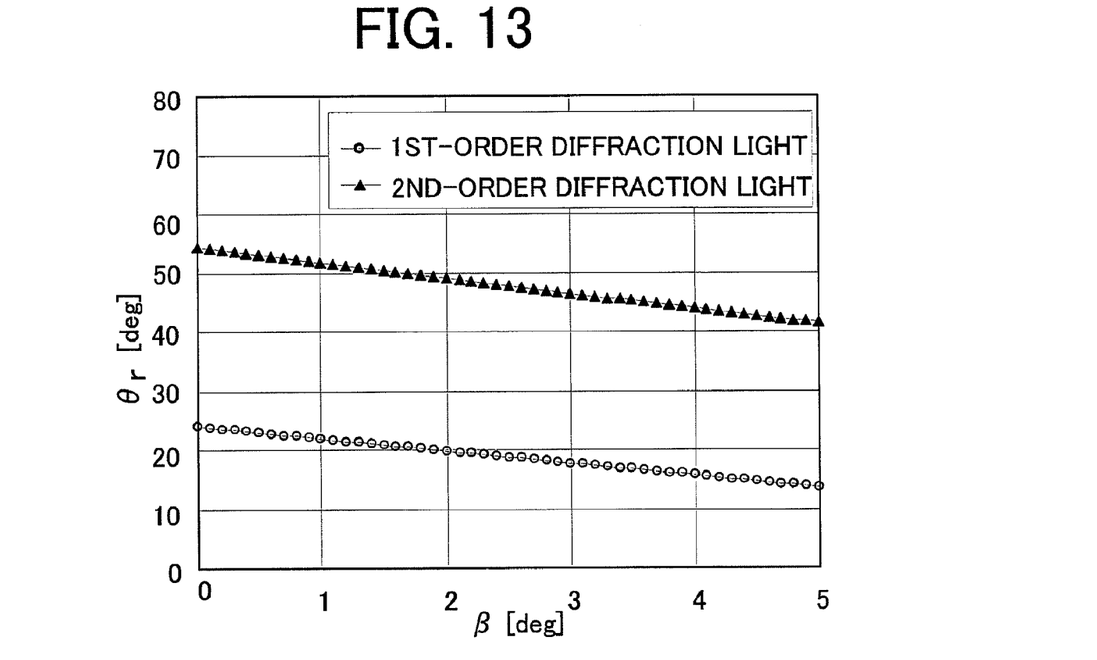
FIG. 13 is a diagram showing a result of calculating directions of a first-order diffraction light and a second-order diffraction light when the optical disc discriminating apparatus according to the second embodiment varies an incident angle while irradiating a CD with a laser light beam.
Figure 14:
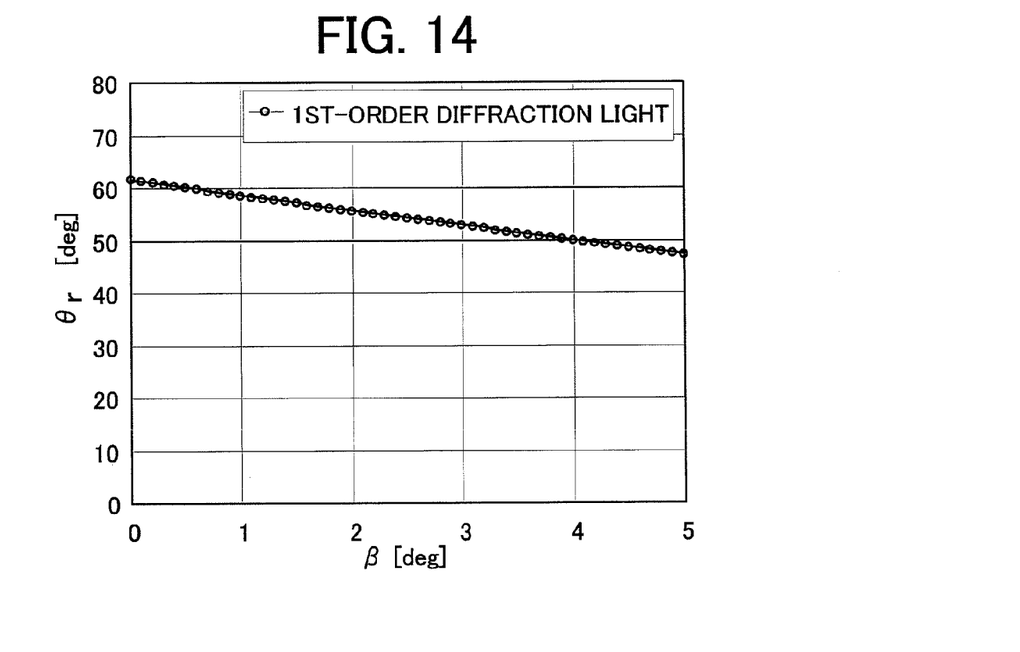
FIG. 14 is a diagram showing a result of calculating a direction of the first-order diffraction light when the optical disc discriminating apparatus according to the second embodiment varies an incident angle while irradiating a DVD with a laser light beam.
Figure 15:
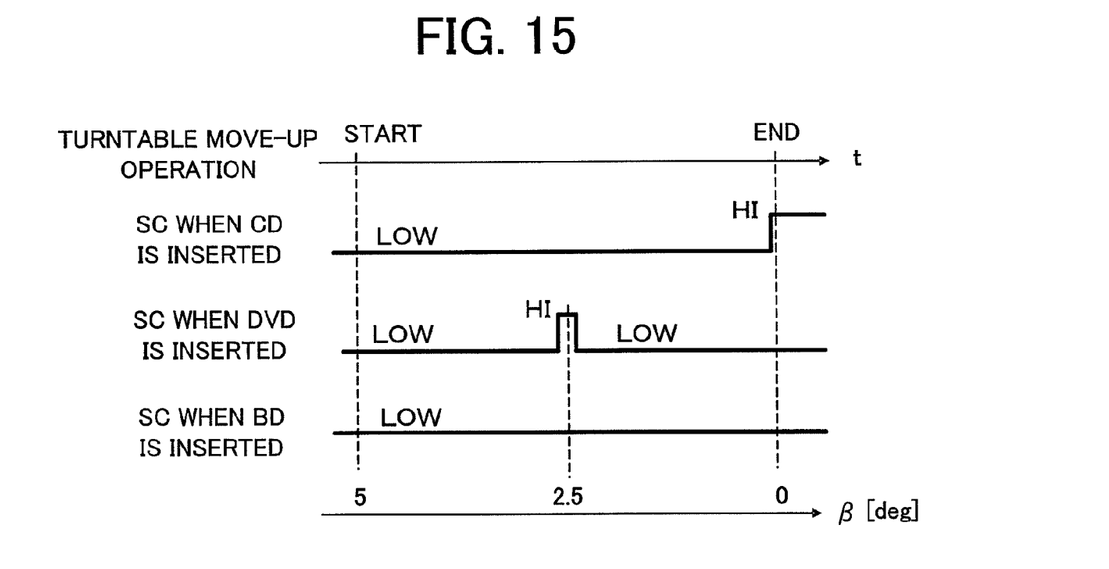
FIG. 15 is a diagram showing comparator outputs when discriminating operation for CD, DVD, and BD is performed by the optical disc discriminating apparatus according to the second embodiment.

FIG. 13 is a diagram showing a result of calculating directions of the first-order diffraction light and the second-order diffraction light when the optical disc discriminating apparatus according to the second embodiment varies the incident angle β while irradiating a CD with the laser light beam. Further, FIG. 14 is a diagram showing a result of calculating directions of the first-order diffraction light when the optical disc discriminating apparatus according to the second embodiment varies the incident angle β while irradiating a DVD with the laser light beam.

In the second embodiment, the laser light beam $L_1$ of λ=0.650 μm is used. θ which is expressed as the function when λ=0.650 μm will be calculated. Since the photodetector 5 is disposed on the plane 8, which is parallel to the traverse chassis 11, (which rotates as the traverse chassis 11 rotates while keeping parallel arrangement to the traverse chassis 11.), $θ_r$ is defined on the basis of the laser light beam $L_1$ which is perpendicular to the plane. If the optical disc 2 is a CD, a relationship between $θ_r$ and the rotation angle β is as shown in FIG. 13. Regarding the diffraction light $L_2$, the first-order diffraction light and the second-order diffraction light are generated and the third or more-order diffraction light are not generated. If the disc is a DVD, a relationship between $θ_r$ and the rotation angle β is as shown in FIG. 14. Regarding the diffraction light $L_2$, only first-order diffraction light is generated. If the disc is a BD, there is no solution of $θ_r$ in relation to the rotation angle β, that is, if the disc is a BD, no diffraction light is generated.

When β=0° holds, the first-order diffraction light $L_{41}$ of the DVD enters the single photodetector 5, which is fixed to the plane 8 parallel to the traverse chassis 11 and detects the second-order diffraction light of the CD and the first-order diffraction light of the DVD, and the photodetector 5 is disposed on the side of the inner circumference of the optical disc as compared with the spot SP. That is, it is determined to place it on a line in a direction of $θ_r$≈54° from the result of the calculation of FIG. 14.

Such setting effects the following states: when the laser light beam $L_1$ from the light beam generating section 3 impinges on a CD, the second-order diffraction light of the CD reaches the photodetector 5 at β≈0°; when the laser light beam $L_1$ from the light beam generating section 3 impinges on a DVD, the first-order diffraction light of the DVD reaches the photodetector at β≈2.5°; and when the laser light beam $L_1$ from the light beam generating section 3 impinges on a BD, no diffraction light is generated and thus no light reaches the photodetector 5.

As described above, the photodetector 5, which detects the second-order diffraction light in the case that the laser light beam $L_1$ from the light beam generating section 3 impinges on a CD and the first-order diffraction light in the case that the laser light beam from the light beam generating section 3 impinges on a DVD, is configured as shown in FIG. 9.

The discriminator 63 shown in FIG. 9 monitors a comparator output signal SC, and if a state transition is caused in order of 'LOW', 'HI' from the start to the end of the turntable move-up operation, it recognizes the disc as a CD and outputs a discriminator output signal SD indicating that the optical disc is a CD. Further, the discriminator 63 monitors the comparator output signal SC, and if a state transition is caused in order of 'LOW', 'HI', 'LOW' from the start to the end of the turntable move-up operation, it determines that the disc is a DVD and outputs a discriminator output signal SD indicating that the optical disc is a DVD. Furthermore, the discriminator 63 monitors the comparator output signal SC, and if the 'LOW' state continues from the start to the end of the turntable move-up operation, it determines that the disc is a BD and outputs a discriminator output signal SD indicating that the optical disc is a BD.

Thus, according to an example of the optical disc discriminating apparatus according to the present invention, when the optical disc 2 is loaded on the disc tray 1, the optical disc is automatically discriminated to be a CD or a DVD or a BD and a result of the discrimination is indicated by the discriminator output SD.

Furthermore, except for the points described above, the second embodiment is the same as the first embodiment.

Third Embodiment

Although, in the first and second embodiments, the light beam generating section 3 in the optical disc discriminating apparatus is explained to be a component different from the semiconductor laser in the optical head in the optical disc apparatus, an example that the light beam generating section 3 in the optical disc discriminating apparatus utilizes the semiconductor laser in the optical head will be described in the third embodiment.

Figure 16:
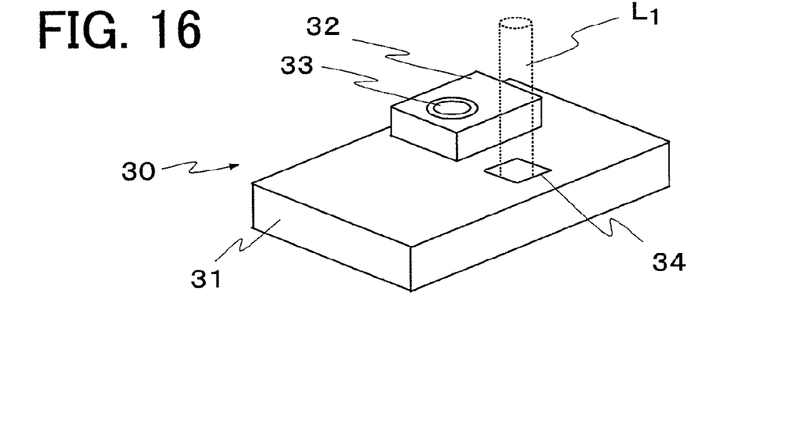
FIG. 16 is a perspective view schematically illustrating an example of a configuration of a light beam generating section in an optical disc discriminating apparatus according to a third embodiment of the present invention.

FIG. 16 is a perspective view schematically illustrating a configuration of the light beam generating section in an optical disc discriminating apparatus according to the third embodiment of the present invention. A light beam generating section 30 shown in FIG. 16 is an optical head that is formed to have a function as a light beam generating section. The light beam generating section 30 includes a case section 31, an objective lens support section 32, and an objective lens 33, wherein the case section 31 has an opening 34 for extracting a light beam. Inside the case section 31, a semiconductor laser (not shown), an optical element for dividing a laser light beam emitted through the objective lens 33 (a beam splitter, for example) (not shown), and a mirror for reflecting the divided laser light beam and emitting the reflected beam from the opening 34 (not shown) are provided.

Figure 17:
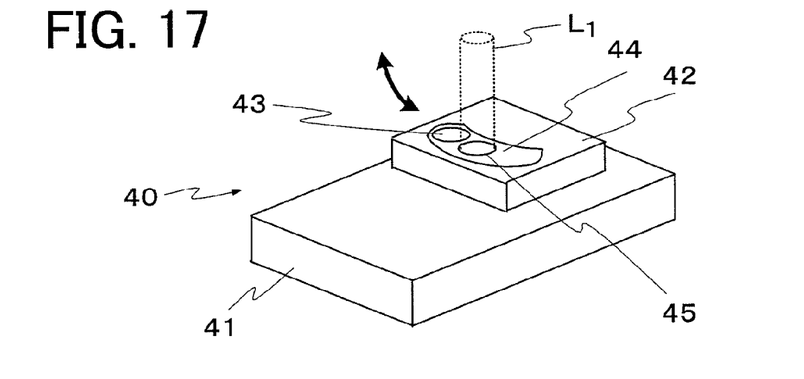
FIG. 17 is a perspective view schematically illustrating another example of a configuration of the light beam generating section according to the third embodiment.

FIG. 17 is a perspective view schematically illustrating another configuration of the light beam generating section in the optical disc discriminating apparatus according to the third embodiment. A light beam generating section 40 shown in FIG. 17 is an optical head that is formed to have a function as a light beam generating section. The light beam generating section 40 has a case section 41, an objective lens support section 42, an objective lens 43, a slide plate 44 on which the objective lens 43 mounted, and an opening 45 for extracting a light beam which is provided in the slide plate 44. Inside the case section 41, a semiconductor laser (not shown) and a mechanism (not shown) for sliding the slide plate 44 along the objective lens support section 42. During the optical disc discriminating operation, the slide plate 44 is moved so that the opening 45 is positioned on an optical path from a semiconductor laser (not shown), and during the operation of reading or writing information from/on an optical disc, the slide plate 44 is moved so that the objective lens 43 is positioned on the optical path from the semiconductor laser.

Figure 18:
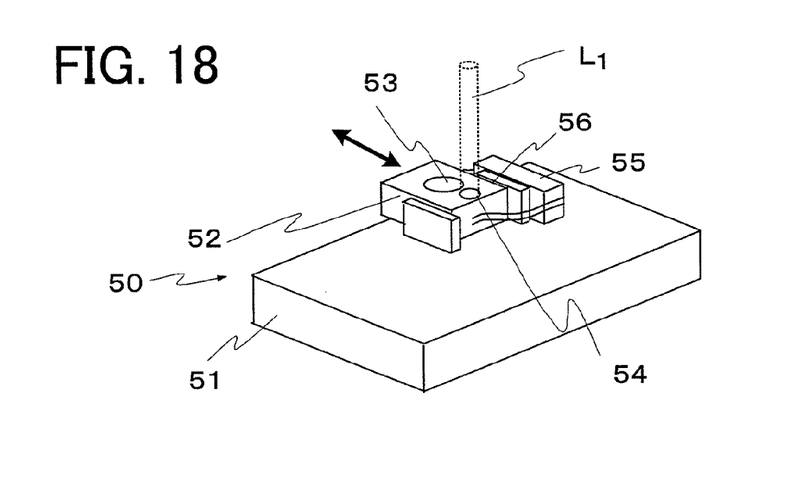
FIG. 18 is a perspective view schematically illustrating another example of a configuration of the light beam generating section according to the third embodiment.

FIG. 18 is a perspective view schematically illustrating another configuration of the light beam generating section in the optical disc discriminating apparatus according to the third embodiment. A light beam generating section 50 shown in FIG. 18 is an optical head that is formed to have a function as a light beam generating section. The light beam generating section 50 includes a first case section 51, a second case section 52 having an opening 54, an objective lens 53 mounted on the second case 52, and a drive mechanism 55 for sliding the second case 52, which has a permanent magnet 56 and an electromagnetic coil (not shown) mounted on the second case 52. During the optical disc discriminating operation, the second case section 52 is moved so that the opening 54 is positioned on an optical path from a semiconductor laser (not shown), and during the operation of reading or writing information from/on an optical disc, the second case section 52 is moved so that the objective lens 53 is positioned on the optical path from the semiconductor laser (not shown).

In the optical disc discriminating apparatus according to the third embodiment, components of the optical head are utilized as components of the optical disc discriminating apparatus, and therefore the number of components constituting the apparatus can be reduced, as compared with a case that the optical disc discriminating apparatus is provided separately from the optical head.

Furthermore, except for the points described above, the third embodiment is the same as the first or second embodiment.

What is claimed is:

1. An optical disc discriminating method of discriminating a type of optical disc which is loaded into an optical disc apparatus, the optical disc discriminating method comprising the steps of:

varying, by an incident angle varying unit, an incident angle of a laser light beam with respect to an optical disc while irradiating the optical disc with the laser light beam from a light beam generating unit;

detecting, by an incident angle detecting unit, a value corresponding to the incident angle when a diffraction light of the laser light beam from a recording track formed on an information recording surface of the optical disc is detected by a photo-detecting unit; and discriminating the type of the optical disc on the basis of the detected value.

2. The optical disc discriminating method according to claim 1, wherein:

operation of varying the incident angle of the laser light beam is operation of rotating a support unit supporting the light beam generating unit and the photo-detecting unit, by a drive unit, and the value corresponding to the incident angle is a tilt angle of the support unit.

3. The optical disc discriminating method according to claim 1, wherein the laser light beam is a parallel light.

4. The optical disc discriminating method according to claim 1, wherein a wavelength of the laser light beam is 0.650 μm.

5. The optical disc discriminating method according to claim 1, further comprising a step of moving the light beam generating unit and the photo-detecting unit in a radial direction of the optical disc, by a radial-direction moving unit mounted on a support unit.

6. The optical disc discriminating method according to claim 1, wherein the light beam generating unit and the photo-detecting unit are arranged so as to be aligned in a radial direction of the loaded optical disc.

7. The optical disc discriminating method according to claim 1, wherein the photo-detecting unit has a single light receiving surface.

8. The optical disc discriminating method according to claim 1, wherein the photo-detecting unit is disposed at a position so that a second-order diffraction light of the diffraction light of the laser light beam impinges thereon when a track pitch of the optical disc is 1.6 μm and the incident angle of the laser light beam impinging on the optical disc is a predetermined angle being larger than 0°.

9. The optical disc discriminating method according to claim 8, wherein the position of the photo-detecting unit is set at a position so that a first-order diffraction light of the diffraction light of the laser light beam impinges thereon when the track pitch of the optical disc is 0.74 μm and the incident angle of the laser light beam impinging on the optical disc is 0°.

10. The optical disc discriminating method according to claim 1, wherein the photo-detecting unit is disposed at a position so that a first-order diffraction light of the diffraction light of the laser light beam impinges thereon when a track pitch of the optical disc is 0.74 μm and the incident angle of the laser light beam impinging on the optical disc is a predetermined angle being larger than 0°.

11. The optical disc discriminating method according to claim 10, wherein a position of the photo-detecting unit is set at a position so that a second-order diffraction light of the diffraction light of the laser light beam impinges thereon when the track pitch of the optical disc is 1.6 μm and the incident angle of the laser light beam impinging on the optical disc is 0°.

12. The optical disc discriminating method according to claim 1, wherein the operation of irradiating the optical disc with the laser light beam from the light beam generating unit is operation of dividing a laser light beam from a semiconductor laser in an optical-head optical system of the optical disc apparatus to impinge on the optical disc.

13. The optical disc discriminating method according to claim 1, wherein the operation of irradiating the optical disc with the laser light beam from the light beam generating unit is operation of causing the laser light beam to impinge on the optical disc while the objective lens is being moved outside an optical path of the laser light beam from a semiconductor laser in an optical-head optical system of the optical disc apparatus.

14. The optical disc discriminating method according to claim 1, wherein the operation of irradiating the optical disc with the laser light beam from the light beam generating unit is operation of sliding a case on which the objective lens is mounted, to move the objective lens outside the optical path of the laser light beam from a light source so that the laser light beam from the light source is output through an opening of the case.

15. An optical disc discriminating apparatus discriminating a type of optical disc which is loaded into an optical disc apparatus, the optical disc discriminating apparatus comprising:
- a light beam generating unit generating a laser light beam, with which the optical disc is irradiated;
- an incident angle varying unit varying an incident angle of the laser light beam with respect to the optical disc;
- a photo-detecting unit;
- an incident angle detecting unit detecting a value corresponding to the incident angle; and
- a control unit which causes the incident angle varying unit to vary the incident angle of the laser light beam with respect to the optical disc while irradiating the optical disc with the laser light beam from the light beam generating unit, and which discriminates the type of the optical disc on the basis of the value corresponding to the incident angle when a diffraction light of the laser light beam from a recording track formed on an information recording surface of the optical disc is detected by the photo-detecting unit.

16. The optical disc discriminating apparatus according to claim 15, wherein the incident angle varying unit including:
- a support unit supporting the light beam generating unit and the photo-detecting unit; and
- a drive unit rotating the support unit;
wherein:
- the operation of varying an incident angle of the laser light beam is operation of rotating the support unit by the drive unit, and
- the value corresponding to the incident angle is a tilt angle of the support unit.

17. The optical disc discriminating apparatus according to claim 15, wherein the laser light beam is a parallel light.

18. The optical disc discriminating apparatus according to claim 15, wherein the laser light beam has a wavelength of 0.650 μm.

19. The optical disc discriminating apparatus according to claim 15, wherein the support unit includes a radial-direction moving unit which moves the light beam generating unit and the photo-detecting unit in a radial direction of the optical disc.

20. The optical disc discriminating apparatus according to claim 15, wherein the light beam generating unit and the photo-detecting unit are arranged so as to be aligned in a radial direction of the loaded optical disc.

21. The optical disc discriminating apparatus according to claim 15, wherein the photo-detecting unit has a single light receiving surface.

22. The optical disc discriminating apparatus according to claim 15, wherein the photo-detecting unit is disposed at a position so that a second-order diffraction light of the diffraction light of the laser light beam impinges thereon when a track pitch of the optical disc is 1.6 μm and the incident angle of the laser light beam impinging on the optical disc is a predetermined angle being larger than 0°.

23. The optical disc discriminating apparatus according to claim 22, wherein a position of the photo-detecting unit is set at a position so that a first-order diffraction light of the diffraction light of the laser light beam impinges thereon when the track pitch of the optical disc is 0.74 μm and the incident angle of the laser light beam impinging on the optical disc is 0°.

24. The optical disc discriminating apparatus according to claim 15, wherein the photo-detecting unit is disposed at a position so that a first-order diffraction light of the diffraction light of the laser light beam impinges thereon when a track pitch of the optical disc is 0.74 μm and the incident angle of the laser light beam impinging on the optical disc is a predetermined angle being larger than 0°.

25. The optical disc discriminating apparatus according to claim 24, wherein a position of the photo-detecting unit is set at a position so that a second-order diffraction light of the diffraction light of the laser light beam impinges thereon when the track pitch of the optical disc is 1.6 μm and the incident angle of the laser light beam impinging on the optical disc is 0°.

26. The optical disc discriminating apparatus according to claim 15, wherein the light beam generating unit includes:
- an optical-head optical system of the optical disc apparatus; and
- a dividing unit dividing a laser light beam which is generated at a semiconductor laser of the optical-head optical system.

27. The optical disc discriminating apparatus according to claim 15, wherein the light beam generating unit includes:
- a semiconductor laser;
- a case;
- an objective lens;
- an objective lens support unit supporting the objective lens which can slide against the case; and
- a unit for sliding the objective lens support unit to move the objective lens outside an optical path of the laser light beam from the semiconductor laser outside the optical path of the laser light beam from the light source.

28. The optical disc discriminating apparatus according to claim 15, wherein the light beam generating unit includes:
- a semiconductor laser;
- a case having an opening;
- an objective lens mounted on the case; and
- a unit for sliding the case to move the objective lens outside the optical path of the laser light beam from the light source so that the laser light beam from the light source is output through an opening of the case.

* * * * *